(12) United States Patent
Ivarsson et al.

(10) Patent No.: US 11,433,849 B2
(45) Date of Patent: Sep. 6, 2022

(54) KNEE AIRBAG MODULE AND METHOD FOR PACKING A KNEE AIRBAG INTO A HOUSING

(71) Applicant: Autoliv Development AB, Vargarda (SE)

(72) Inventors: Patrik Ivarsson, Alingsås (SE); Jonas Gustafsson, Nossebro (SE); Henrik Balague, Falköping (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 16/606,924

(22) PCT Filed: Apr. 18, 2018

(86) PCT No.: PCT/EP2018/059874
§ 371 (c)(1),
(2) Date: Oct. 21, 2019

(87) PCT Pub. No.: WO2018/192958
PCT Pub. Date: Oct. 25, 2018

(65) Prior Publication Data
US 2020/0047706 A1 Feb. 13, 2020

(30) Foreign Application Priority Data
Apr. 21, 2017 (DE) .......................... 102017108493.2

(51) Int. Cl.
| | | |
|---|---|---|
| *B60R 21/237* | (2006.01) | |
| *B60R 21/206* | (2011.01) | |
| *B60R 21/231* | (2011.01) | |
| *B60R 21/235* | (2006.01) | |
| *B60R 21/26* | (2011.01) | |
| *B60R 21/00* | (2006.01) | |

(52) U.S. Cl.
CPC .......... *B60R 21/237* (2013.01); *B60R 21/206* (2013.01); *B60R 21/231* (2013.01);
(Continued)

(58) Field of Classification Search
CPC ... B60R 21/237; B60R 21/206; B60R 21/231; B60R 21/235; B60R 21/26; B60R 2021/0051; B60R 2021/23169
See application file for complete search history.

(56) References Cited

U.S. PATENT DOCUMENTS 8,302,991 B2  11/2012  Hong et al.
8,540,276 B2   9/2013  Schneider et al.
(Continued)

FOREIGN PATENT DOCUMENTS

EP     2072348 A2     6/2009
WO  WO2013070524 A1  5/2013

OTHER PUBLICATIONS

International Search Report of the International Searching Authority for PCT/EP2018/059874 dated Jun. 19, 2018.

*Primary Examiner* — Drew J Brown
(74) *Attorney, Agent, or Firm* — Stoel Rives LLP

(57) ABSTRACT

A knee airbag module comprising a housing (10) and a knee airbag is described. A first section of the knee airbag following from its first end is rolled into a first direction of rotation when the knee airbag is in its stowed state. In order to optimise the knee airbag for a mounting situation in which a gap is present between the vehicle rearward end of the housing and the lower end of the instrument panel, a second section of the knee airbag following the first section is rolled in a second direction of rotation, contrariwise to the first direction rotation, such that the stowed knee airbag comprises an at least partially rolled package comprising the first section being rolled to a first roll section (50) and the second section being rolled to a second roll section (52).

8 Claims, 9 Drawing Sheets

Figure 1A:
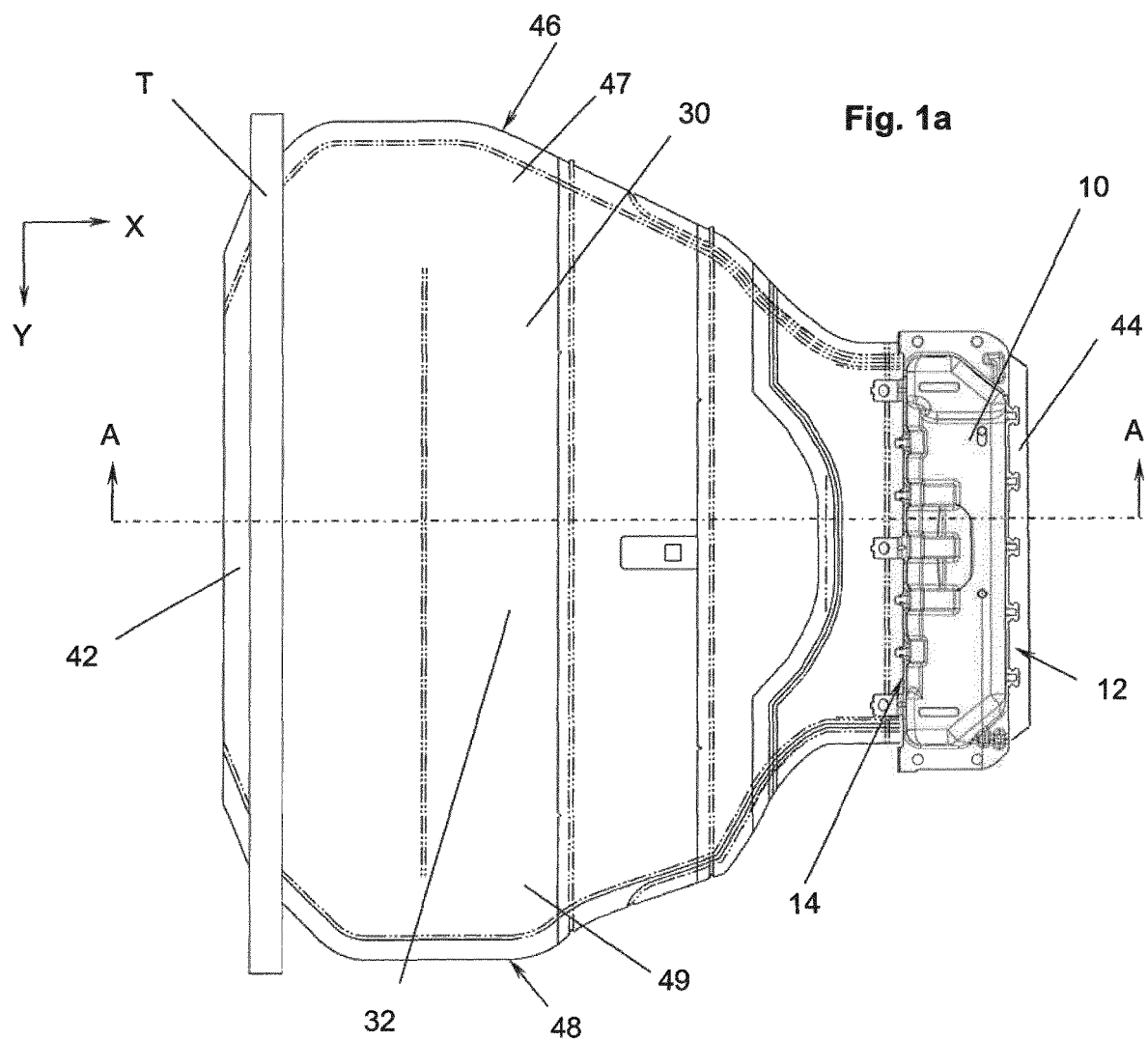

(52) U.S. Cl.
CPC ............ *B60R 21/235* (2013.01); *B60R 21/26* (2013.01); *B60R 2021/0051* (2013.01); *B60R 2021/23169* (2013.01)

(56) References Cited

U.S. PATENT DOCUMENTS

| | | | | |
|---|---|---|---|---|
| 9,156,425 | B1* | 10/2015 | Solomon | B60R 21/206 |
| 2003/0107206 | A1* | 6/2003 | Takimoto | B60R 21/206 |
| | | | | 280/730.1 |
| 2009/0058048 | A1* | 3/2009 | Ishida | B60R 21/20 |
| | | | | 280/728.2 |
| 2009/0152847 | A1* | 6/2009 | Hong | B60R 21/206 |
| | | | | 280/730.1 |
| 2009/0230661 | A1* | 9/2009 | Fukawatase | B60R 21/237 |
| | | | | 280/730.1 |
| 2009/0256340 | A1* | 10/2009 | Williams | B60R 21/237 |
| | | | | 280/741 |
| 2012/0313358 | A1* | 12/2012 | Okamoto | B60R 21/2346 |
| | | | | 280/740 |
| 2013/0113190 | A1* | 5/2013 | Schneider | B60R 21/237 |
| | | | | 280/728.2 |
| 2014/0252750 | A1* | 9/2014 | Kim | B60R 21/237 |
| | | | | 280/730.1 |
| 2016/0052480 | A1* | 2/2016 | Jung | B60R 21/206 |
| | | | | 280/730.1 |
| 2016/0059815 | A1* | 3/2016 | Jung | B60R 21/2338 |
| | | | | 280/730.1 |
| 2020/0047704 | A1* | 2/2020 | Kodera | B60R 21/235 |

\* cited by examiner

KNEE AIRBAG MODULE AND METHOD FOR PACKING A KNEE AIRBAG INTO A HOUSING

The invention relates to a knee airbag module according to the preamble of claim 1 and to a method for packing a knee airbag into a housing according to claim 8.

Knee airbag modules are used in the automotive technology since many years. Many of the airbag modules used today are so-called low mount knee airbag modules which have a position within the vehicle as described for example in DE 10 2006 040 177 A1. The housing of such a low mount knee airbag module is usually mounted adjacent to the lower end of the instrument panel, such that the housing extends from this end of the instrument panel towards the vehicle front in a basically horizontal direction. The knee airbag which is located in said housing when it is in its stored state, has a rather complex deployment behaviour. In the first stage of the deployment this knee airbag exits the housing in a basically vertical direction towards the floor of the vehicle. Next the knee airbag deploys in a basically horizontal direction towards the occupant to be protected and finally the knee airbag "climbs up" the lower part of the instrument panel such that in the fully deployed state a protecting section of the knee airbag is positioned between the lower part of the instrument panel and the knee-shin areas of the occupant's legs. A lower part of the knee airbag which connects the protection section with the housing is not intended for being hit by a body part of the occupant.

The deployed knee airbag of such a low mount knee airbag module is usually banana- or L-shaped. A low mount knee airbag module with a L-shaped knee airbag is for example described in WO 2011/056810 A1.

Generic WO 2013/070524 A1 also describes a low mount knee airbag module whose knee airbag has basically an L-shape when fully deployed. In this document various possibilities packing patterns for the knee airbag are described which lead to a desired deployment behaviour. Especially it is described that a housing remote section of the knee airbag is rolled in a first direction in order to form a rolled package and that a section of the knee airbag between this rolled package and the inflator is folded in order to form at least one so-called deployment fold. The rolled package forms an inward-roll meaning that the rolled package is rolled onto the housing side layer of this knee airbag. This rolling direction makes the deploying knee airbag "climb up" the instrument panel.

In some vehicle geometries it is desired to position the housing of such a low mount knee airbag module relatively far away from the lower end of the instrument panel towards the front of the vehicle. Consequently a relatively large gap can exist between the vehicle rearward end of the housing and the lower end of the instrument panel.

Starting from this the current invention sets itself the problem to provide a knee airbag module of the generic type which is optimised for a mounting situation in which a gap is present between the vehicle rearward end of the housing and the lower end of the instrument panel.

This task is solved by a knee airbag module with the features of claim 1. A folding method for a knee airbag of such module is defined in claim 8.

According to the invention the knee airbag comprises a rolled package (as the knee airbag of generic WO 2013/070524 A1), but this rolled package comprises two sections that are rolled in contrariwise directions of rotation. Usually the housing remote section of this rolled package forms an inward-roll that leads to a "traditional" deployment behaviour at a later stage of the deployment, while the housing side section helps the unfolding knee airbag to bridge a gap between the vehicle rearward end of the housing and the lower end of the instrument panel.

Preferred embodiments are defined in the sub-claims.

Figure 1B:
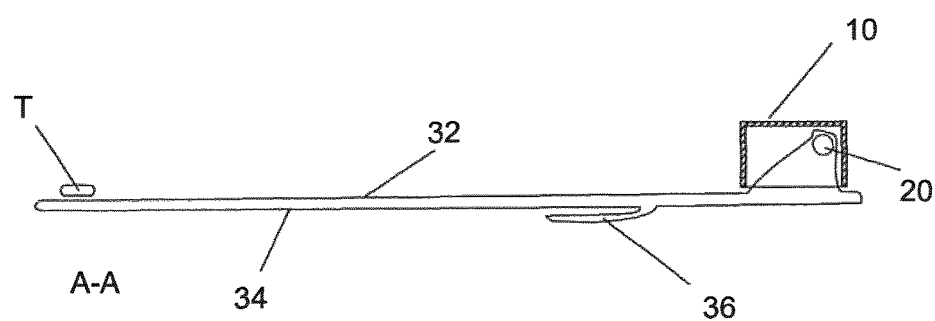
Figure 2A:
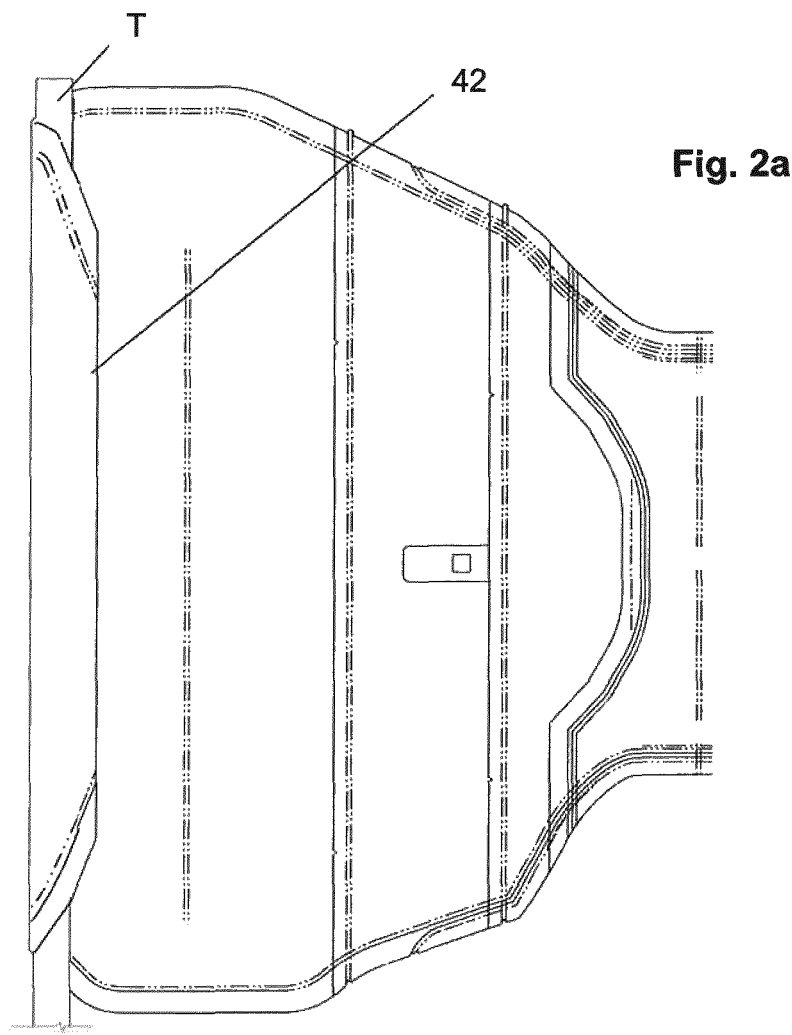
Figure 2B:
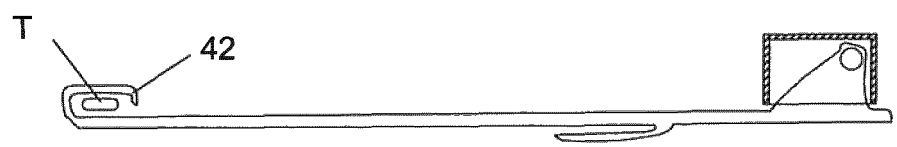
Figure 3A:
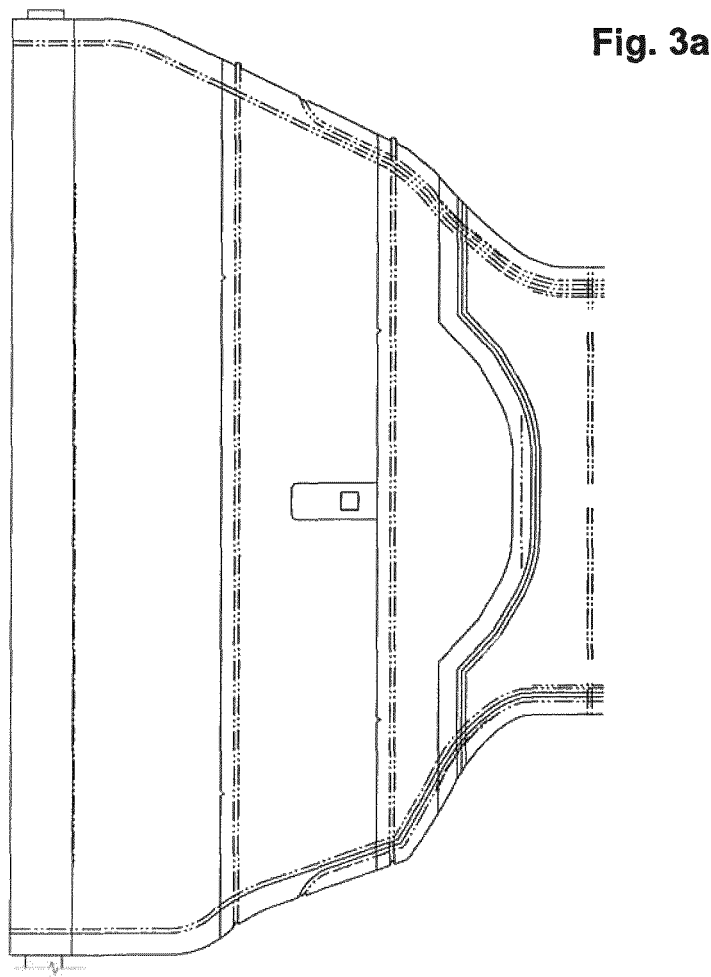
Figure 3B:
Figure 4A:
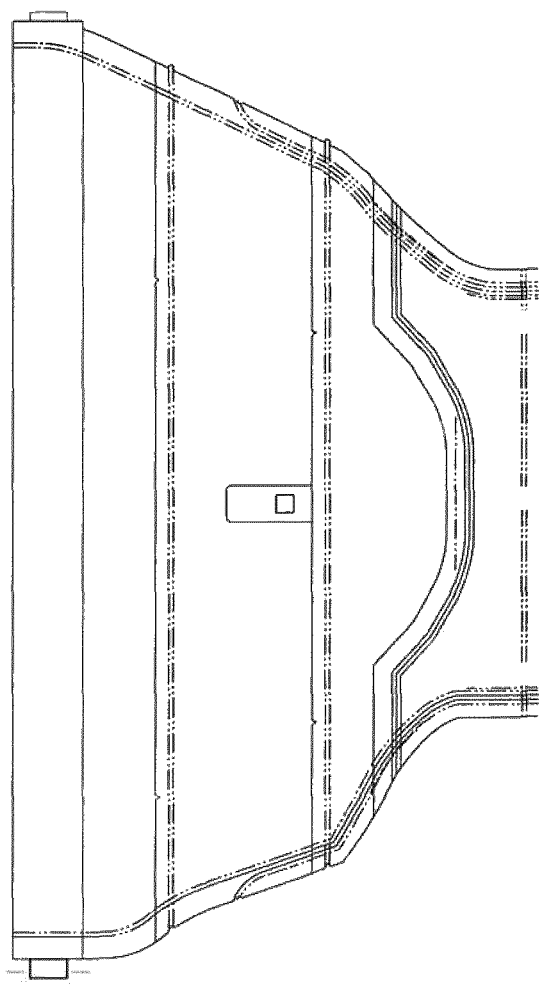
Figure 4B:
Figure 5A:
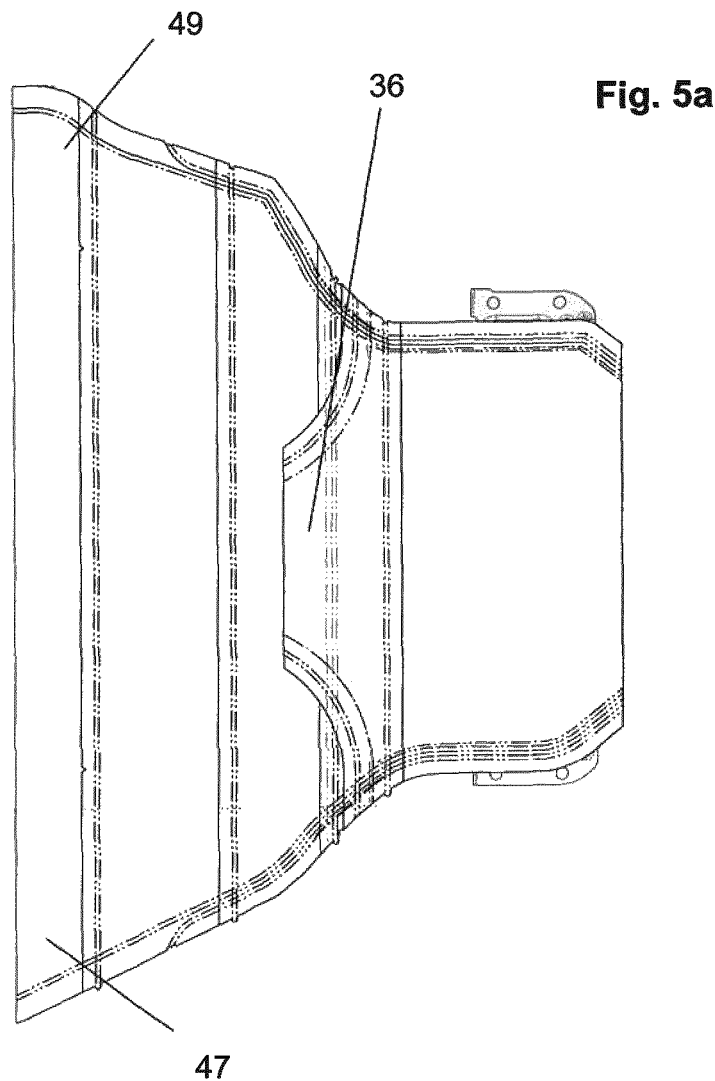
Figure 5B:
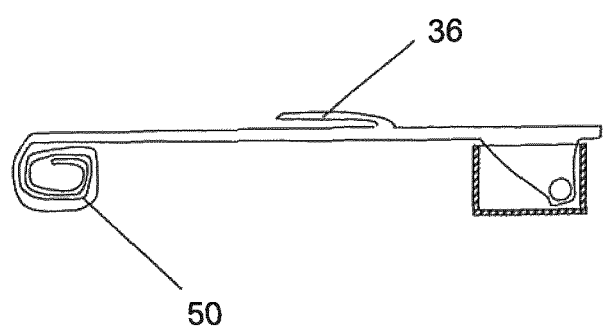
Figure 6:
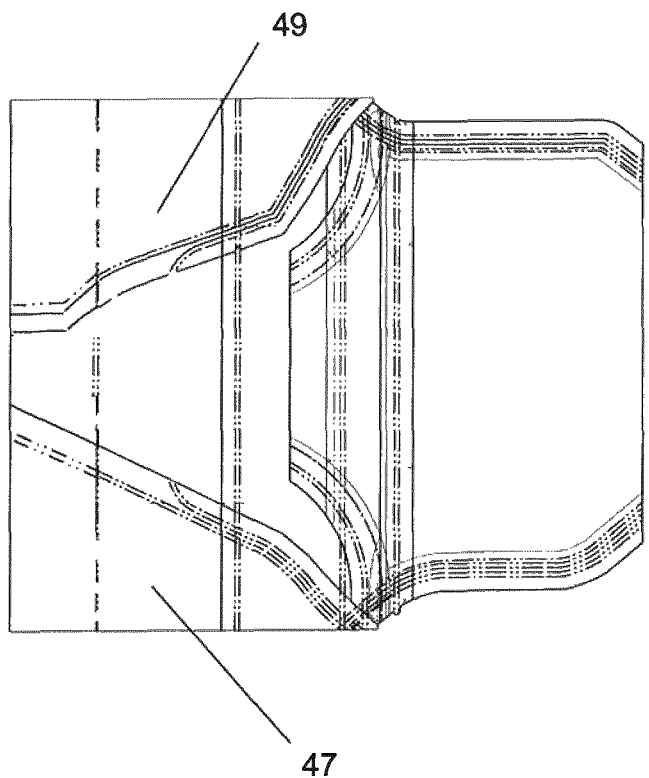
Figure 7:
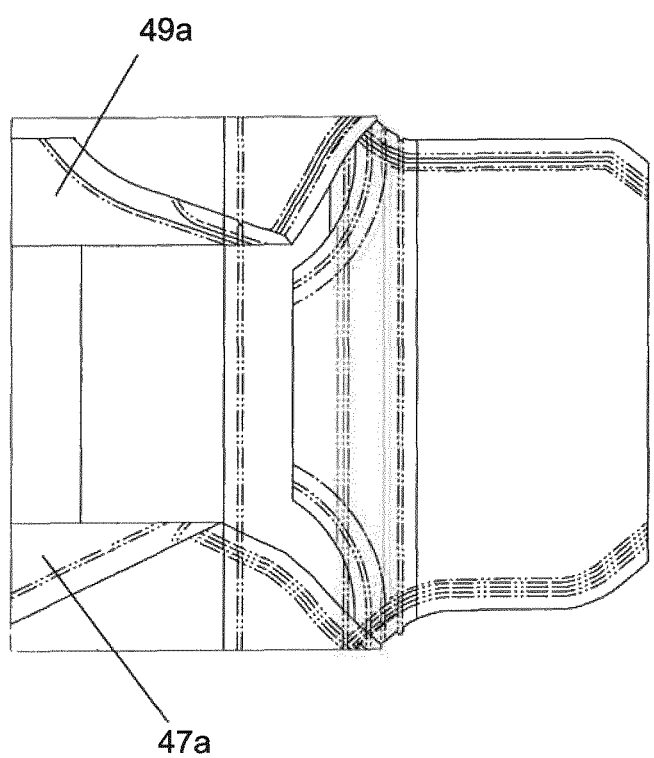
Figure 8A:
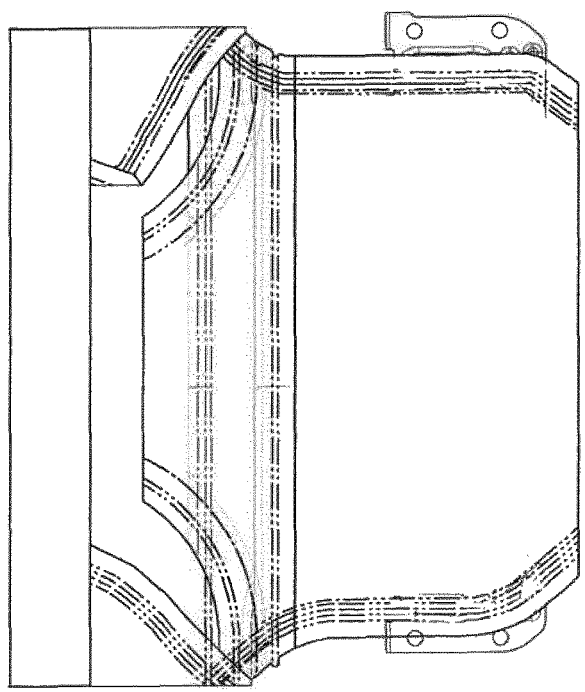
Figure 8B:
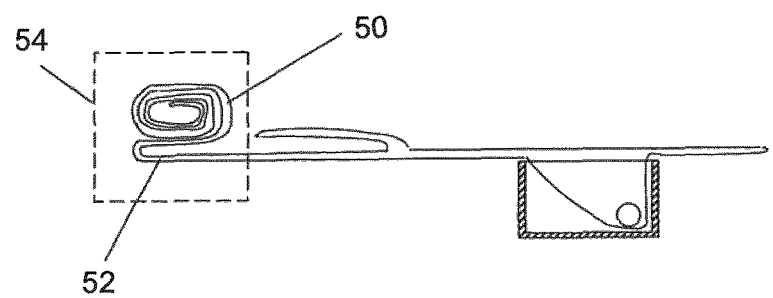
Figure 9:
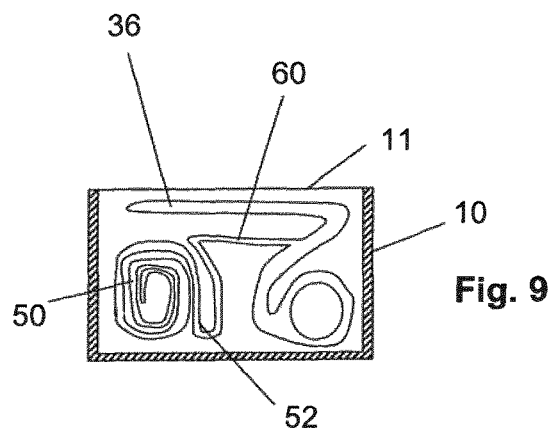
Figure 10:
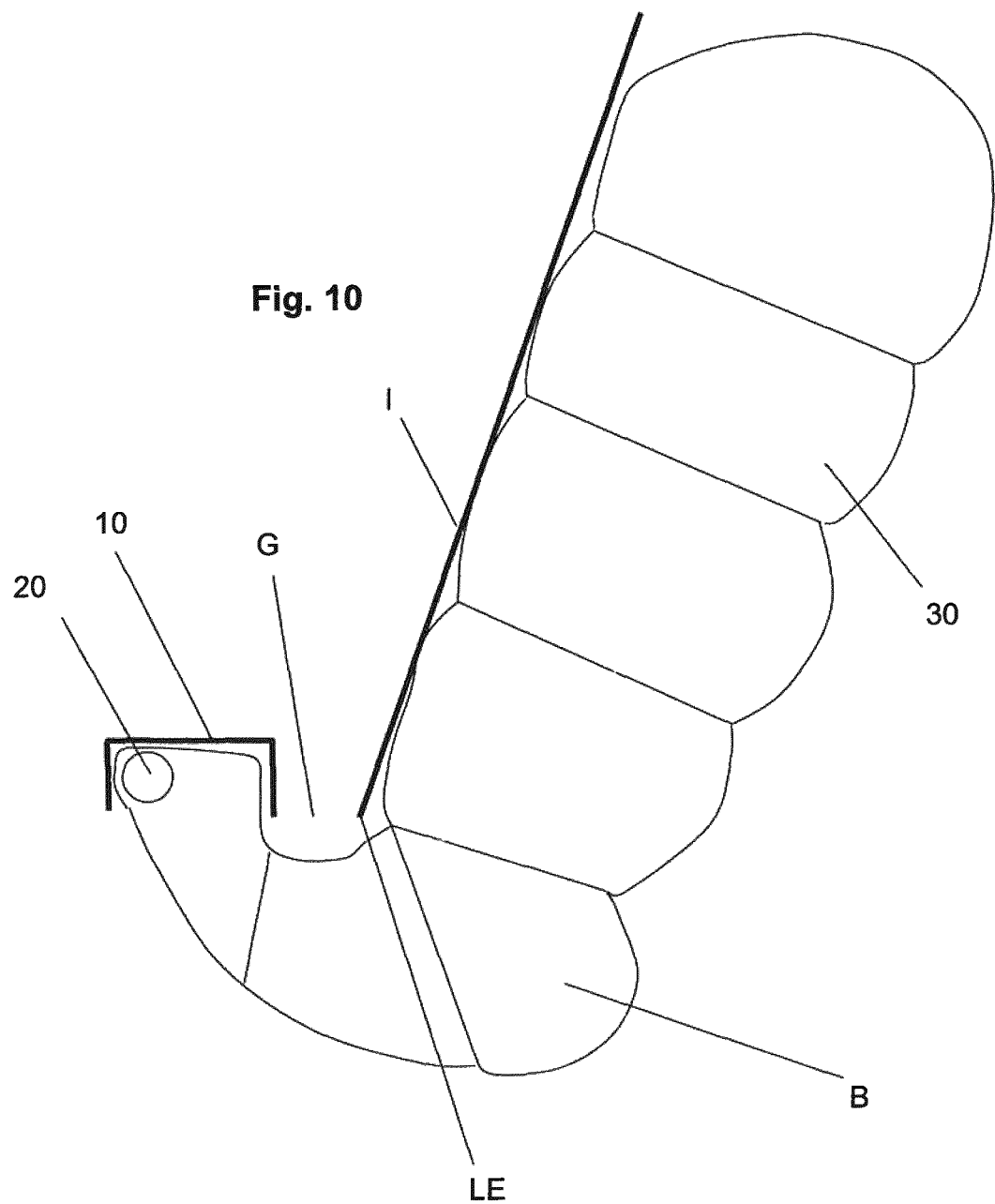

The invention will now be described by means of a preferred embodiment in view of the figures. The figures show:

FIG. 1a a preferred embodiment of the inventive knee airbag module in a detailed top view in a state in which the knee airbag of the knee airbag module is completely unfolded prior to packing the same into the housing, FIG. 1b what is shown in FIG. 1a in a sectional view along the plane A-A in FIG. 1a, but in a strongly schematic and reduced representation, FIG. 2a what is shown in FIG. 1a after an initial packing step has been performed, FIG. 2b what is shown in FIG. 2a in a representation according to FIG. 1b, FIG. 3a what is shown in FIG. 2a in a subsequent packing state, FIG. 3b what is shown in FIG. 3a in a representation according to FIG. 2b, FIG. 4a what is shown in FIG. 3a in a further subsequent packing state, FIG. 4b what is shown in FIG. 4a in a representation according to FIG. 3b, FIG. 5a what is shown in FIG. 4a after the knee airbag module has been turned around, FIG. 5b what is shown in FIG. 5a in a representation according to FIG. 4b, FIG. 6 what is shown in FIG. 5a (but without the housing) after a subsequent packing step has been performed by folding lateral areas to the inside, FIG. 7 what is shown in FIG. 6 after a further packing step, FIG. 8a what is shown in FIG. 7 (but including the housing) after a further packing step has been performed, FIG. 8b what is shown in FIG. 8a in a representation according to FIG. 5b, FIG. 9 the knee airbag module with the knee airbag being completely packed into the housing, FIG. 10 the airbag module just described being mounted into a vehicle in a state in which the knee airbag is completely deployed. The representation is basically as in FIG. 9 but with tethers of the knee airbag being shown.

Figure 11:
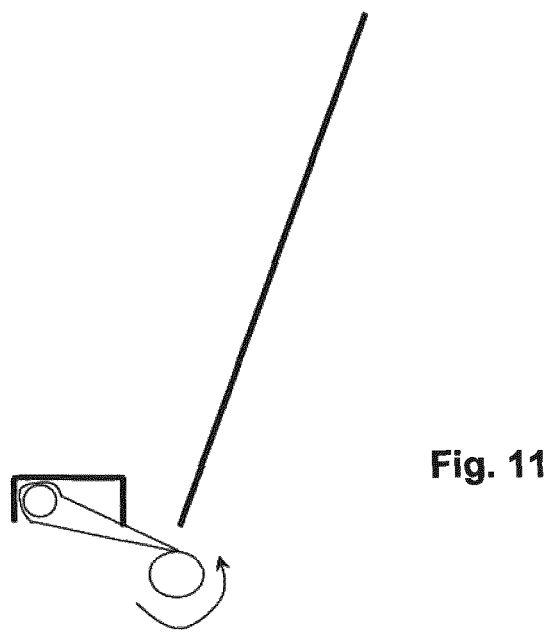

FIG. 11 basically what is shown in FIG. 10 at an early stage of the deployment of the knee airbag, in a reduced representation and FIG. 12 what is shown in FIG. 11 at a later point in time.

FIGS. 1a and 1b show a complete knee airbag module in a state in which the knee airbag 30 is attached to the housing 10 (usually via not shown mounting studs of the inflator 20) but is not yet packed into that housing 10. As will be seen later the knee airbag 30 has basically an L-shaped cross-section when it is in its deployed state. The knee airbag 30 is basically made as is for example known from. It has a first layer 32 (housing side layer) and a second layer 34. Usually tethers extend between these two layers 32 and 34, but these tethers are not shown in the schematic cross sectional representation of FIG. 1b. A double layered fold 36 extends from the second layer 34. In the deployed state this double layered fold 36 turns to a "bubble" B (see FIG. 11) which is responsible for giving the knee airbag 30 its L-shape when fully deployed. A knee airbag with a very similar structure is for example known from WO 2014/16337 A1.

The knee airbag 30 extends in a first direction X from a housing remote first end 42 to a housing near second end 44. The knee airbag is connected to the housing at or near its second end 44. In a second direction Y (lateral direction) perpendicular to the first direction X the knee airbag 30 extends from a first lateral edge 46 to a second lateral edge 48. As can be seen from FIG. 1a the maximum width of the knee airbag exceeds the width of the housing 10. Additionally to the module a ruler-shaped folding tool T is shown in FIGS. 1a and 1b.

FIGS. 2a to 4b show a first step in the rolling and folding process—also referred to as the packing process—of the knee airbag 30. By rolling the knee airbag 30 from its first end 42 onto the first layer 42 a first section 50 of a rolled package is formed. FIGS. 4a and 4b show the state when the forming process of this first roll section 50 of the rolled package is finished.

In the next step the folding tool T is removed from the first roll section 50 and the complete knee airbag module is turned around. FIGS. 5a and 5b show this turned around state.

Now the first lateral area 47 next to the first lateral edge 46 and the second lateral area 49 next to the second lateral edge 48 are folded inwards. The result of this folding step is shown in FIG. 6. In the next step the outer section 47a of the first lateral area 47 and the outer section 49a of the second lateral area 49 are folded outward. The result of this is shown in FIG. 7. In the two folding steps just described the first roll section 50 of the rolled package and a part of the not yet folded or rolled knee airbag 30 are folded in order to reduce the width of the knee airbag in its second direction Y basically to the width of the housing 10.

Now the knee airbag 30 is again rolled, but in a contrariwise direction of rotation than the first section 50 of the rolled package. So, a second roll section 52 of the rolled package is formed. This second roll section 54 is adjacent to the first roll section 52 (FIGS. 8a and 8b).

The remaining, not yet rolled or folded part of the knee airbag 30 is folded, such that at least one final fold 60 is generated and the now completely packed knee airbag 30 is placed into the housing 10, such that the knee airbag is now in its stowed state (FIG. 9). The term "final fold" is chosen because it's the last fold being generated during the packing process. In view of the deployment it is the first fold (deployment fold).

Usually a cover is now applied to the housing 10 in order to close its deployment opening 11.

In this state the knee airbag module can be mounted into a motor vehicle. FIG. 10 shows the described knee airbag module being mounted into a motor vehicle with the knee airbag 30 being completely deployed. The cross sectional representation of FIG. 10 is basically as schematic as for example FIG. 9, but tethers connecting the two layers 32 and 34 of the knee airbag 30 are shown. As one can see from FIG. 10 the housing 10 is mounted to the vehicle structure near the lower end LE of an instrument panel E on the vehicle front side of the instrument panel E. The deployment opening 11 extends basically in the horizontal plane. As can also be seen from FIG. 11 a gap G can exist between the housing 10 and the lower edge of the instrument panel E. By the folding and rolling technique just described the knee airbag can easily pass over this gap when deploying, even if this gap G is relatively large, unlike knee airbags that are folded according to the folding patterns know in the prior art. The length of the gap G in the longitudinal direction of the vehicle basically corresponds to the total length of the final fold 60 and second roll section 52.

Figure 12:
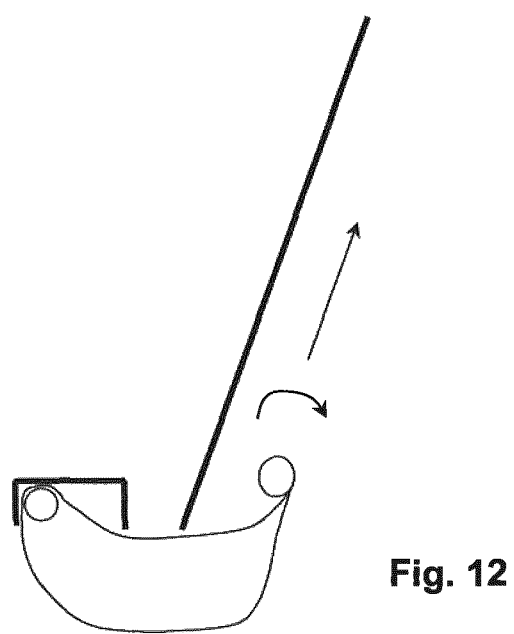

FIGS. 11 and 12 schematically show the unrolling of the knee airbag 30 during the deployment. One can see that after the deploying knee airbag 30 has left the housing 10 the deploying airbag 30 first unrolls in an "outward" direction of rotation and then in a second, contrariwise "inward" direction of rotation. By means of this this deployment behaviour the knee airbag can bridge a large gap with the "outward" roll but deploys as a "regular" knee airbag with the "inward" roll between the knee-shin-areas of the occupant and the instrument panel. Without the "outward" roll, the knee airbag would not be able to pass the gap G.

LIST OF REFERENCE NUMBERS 10 housing
11 deployment opening
12 vehicle forward end
14 vehicle rearward end
20 inflator
30 knee airbag
32 first layer (housing side layer)
34 second layer
36 double-layered fold
42 first end (housing remote end)
44 second end (housing near end)
46 first lateral edge
47 first lateral area
47a outer section of first lateral area
48 second lateral edge
49 second lateral area
49a outer section of second lateral area
50 first roll section of rolled package
52 second roll section of rolled package
54 rolled package
60 final fold
B bubble
G gap
I instrument panel
T folding tool

The invention claimed is:

1. A knee airbag module comprising:
a housing extending from a vehicle forward end to a vehicle rearward end;
a knee airbag being located in said housing when in its stowed state and deploying out of this housing when filled with gas,
wherein said knee airbag has a first layer and a second layer with the first layer being the housing side layer when the knee airbag is in a flat, unpacked state, and
wherein the unpacked or deployed knee airbag extends in a first direction from a housing remote first end to a housing near second end and in a second direction perpendicular to the first direction from a first lateral edge to a second lateral edge;
a first section of the knee airbag following from its first end is rolled into a first direction of rotation when the knee airbag is in its stowed state;
an inflator for filling the airbag with gas; and
a second section of the knee airbag following the first section is rolled in a second direction of rotation, contrariwise to the first direction rotation, such that the stowed knee airbag comprises an at least partially rolled package, said package comprising the first section being rolled to a first roll section and the second section being rolled to a second roll section encompassing at least a part of the first roll section or being adjacent to the first roll section, wherein the second layer comprises an additional double-layered fold when the airbag is in its unpacked, un-deployed state, said additional double-layered fold turning into a bubble when the knee airbag is filled with gas such that the fully deployed knee airbag shows an L-shaped cross-section with the bubble defining the joint between the two legs of the L, wherein the additional double-layered fold is disposed between the second section and the attachment between the knee airbag and the housing.

2. The knee airbag module of claim 1, wherein the first roll section is rolled onto the first layer.

3. The knee airbag of claim 2, wherein at least a part of at least one lateral area of the knee airbag is folded to the inside in order to reduce the width of the knee airbag.

4. The knee airbag of claim 1, wherein at least a section of the double-layered fold is adjacent to at least a part of the rolled package.

5. The knee airbag of claim 1, wherein the stowed knee airbag comprises at least one final fold being positioned between the second section and the double-layered fold.

6. The knee airbag of claim 1, wherein at least a part of at least one lateral area of the knee airbag is folded to the inside in order to reduce the width of the knee airbag.

7. A method for packing a knee airbag into a housing, comprising the following steps:
  providing a housing;
  providing a knee airbag having a first layer and a second layer and extending in a first direction from a housing remote first end to a housing near second end and in a second direction perpendicular to the first direction from a first lateral edge to a second lateral edge;
  connecting the knee airbag to the housing at or near the second end of the knee airbag in such a way that the first layer constitutes the housing side layer when the knee airbag is unfolded;
  rolling a first section of the airbag following from its first end in a first direction of rotation; and
  rolling a second section of the knee airbag in a second direction of rotation contrariwise to the first direction of rotation, such that after the rolling in the second direction of rotation the knee airbag comprises an at least partially rolled package, said package comprising the first section being rolled to a first roll section and the second section being rolled to a second roll section, wherein between the rolling in the first direction and the rolling in the second direction at least one lateral area adjacent to a lateral edge is folded inward in order to reduce the width of the knee airbag in the second direction, and wherein after the inward folding of the lateral area, an outer section of this lateral area is folded back outwards.

8. The method of claim 7, wherein at least one final fold is folded into the knee airbag between the rolled package and the connection between the knee airbag and the housing.

* * * * *